United States Patent [19]

Sodeikat

[11] Patent Number: 4,667,104
[45] Date of Patent: May 19, 1987

[54] METHOD AND APPARATUS FOR DERIVING AN OFF-COURSE SIGNAL FOR AN ORBITING EARTH SEATELLITE BY MEANS OF AN EARTH-HORIZON SENSOR

[75] Inventor: Dieter Sodeikat, Baierbrunn, Fed. Rep. of Germany

[73] Assignee: Messerschmitt-Bölkow-Blohm Gesellschaft mit beschränkter Haftung, Munich, Fed. Rep. of Germany

[21] Appl. No.: 745,022

[22] Filed: Jun. 13, 1985

[30] Foreign Application Priority Data

Jun. 14, 1984 [DE] Fed. Rep. of Germany ....... 3422005

[51] Int. Cl.$^4$ .................................................. G01J 1/34
[52] U.S. Cl. .................................... 250/338; 250/342; 250/347; 250/351
[58] Field of Search ............... 250/338, 349, 347, 342, 250/352, 351; 364/434, 459

[56] References Cited

U.S. PATENT DOCUMENTS

| | | | |
|---|---|---|---|
| 3,486,024 | 12/1969 | Astheimer | 250/338 |
| 3,551,681 | 12/1970 | Astheimer | 250/349 |
| 3,638,021 | 1/1972 | Hickerson | 250/342 |
| 3,714,432 | 1/1973 | Jalink, Jr. | 250/340 |
| 3,920,994 | 11/1975 | Cargille | 250/347 |

Primary Examiner—Carolyn E. Fields
Assistant Examiner—Richard Hanig
Attorney, Agent, or Firm—Toren, McGeady and Goldberg

[57] ABSTRACT

A method and apparatus for deriving an off-course signal for an orbiting earth satellite, preferably a geostationary satellite, by an earth-horizon sensor. The earth-horizon sensor operates in the infrared range and comprises, in the focal plane of an input lens, a chopper disk, which is periodically reciprocated with a determined chopper frequency (f) and which has a diameter corresponding to the image of the earth, and a detector (1) receiving the periodically interrupted radiation of opposite earth rims. The output signal of the detector is demodulated synchronously with the chopper frequency (f) and corrected with a correction signal corresponding to different temperatures of opposite earth rims (earth anomaly). In order to be able to use the earth-horizon sensor not only as a ZERO-seeking sensor, but also as an angle-measuring sensor the amplified detector output signal is additionally demodulated synchronously with the second harmonic wave of the chopper frequency (2f) thereby producing a presence signal ($U_p$). This presence signal, or a reference signal produced from the presence signal and the amount of the corrected off-course signal ($|U_{DO}|$), respectively, are used in order to draw the characteristic line of the earth-horizon sensor into the desired characteristic line of the earth-horizon sensor, also during a "off-pointing", by controlling the amplification factor for the detector output signal, which is applicable for the instance when the line of sight of the earth-horizon sensor, which line of sight is fixed with respect to the satellite, is aligned with the earth central point.

4 Claims, 8 Drawing Figures

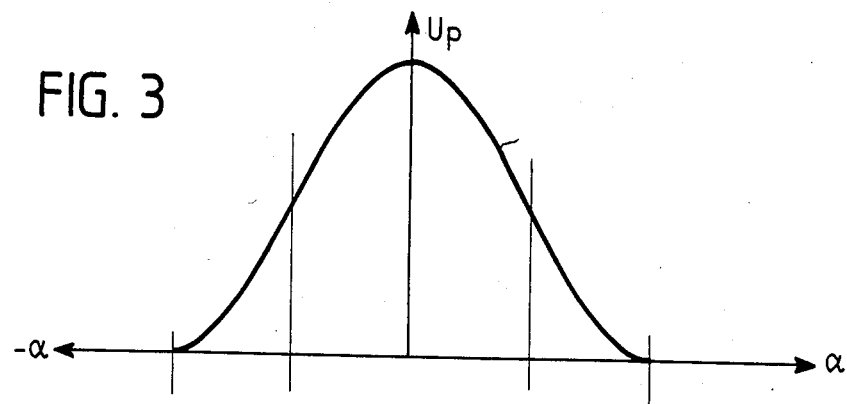
FIG. 3
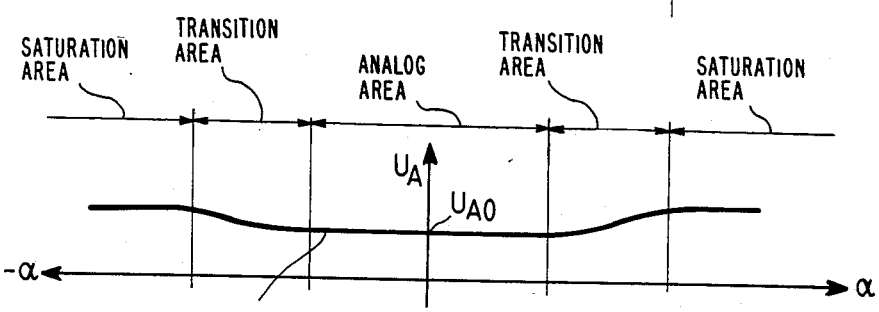
Fig.2
FIG. 4
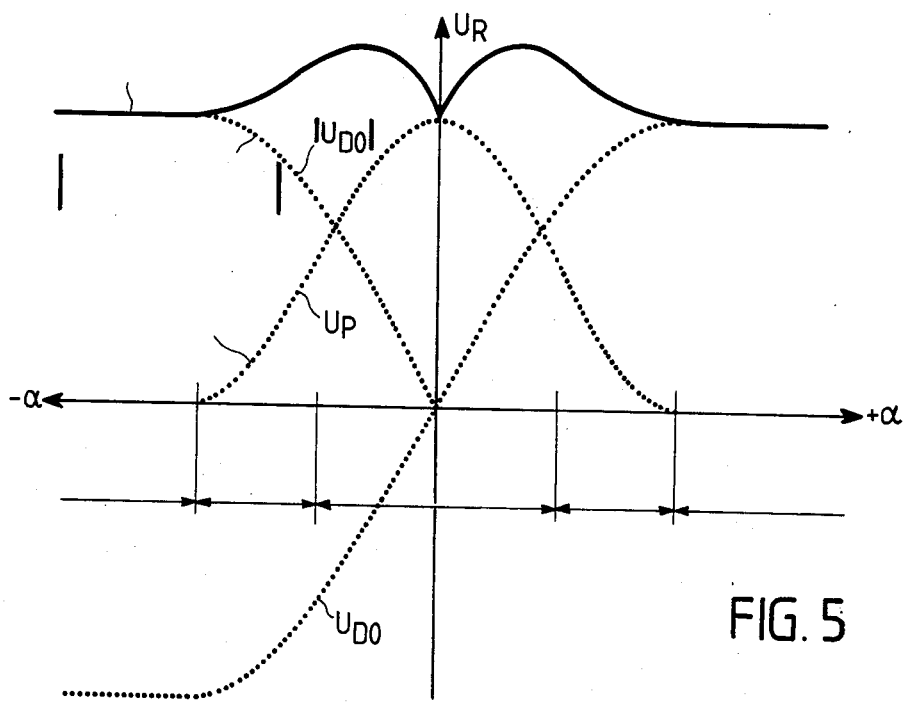
FIG. 5

METHOD AND APPARATUS FOR DERIVING AN OFF-COURSE SIGNAL FOR AN ORBITING EARTH SEATELLITE BY MEANS OF AN EARTH-HORIZON SENSOR

BACKGROUND OF THE INVENTION

1. Field of the Invention:

The invention is directed to a method and an apparatus for deriving an off-course signal for an orbiting earth satellite by means of an earth-horizon sensor which operates in the infrared range and includes, in the focal plane of an input lens, a chopper disk which is periodically reciprocated at a determined chopper frequency and has a diameter corresponding to an image of the earth, and a detector for receiving periodically interrupted light radiations from opposite earth rims, wherein the output signal of the detector is demodulated synchronously with the chopper frequency and is corrected with a correcting signal (anomaly signal) corresponding to different temperatures of the opposite earth rims (earth anomaly) in order to form an angle-dependent off-course signal.

2. Description of Related Art:

For the attitude control, preferably triaxial of such triaxial, geostationary earth satellites off-course signals are required which indicate the deviation of a line of sight in relation to the satellite/earth central point connecting line, the line of sight being fixed relative to the satellite. For this purpose, optical earth-horizon sensors operating in the infrared range, which can be classed with ZERO-seeking sensors, are used, among others, for two axes. Such an earth-horizon sensor is based on the mechanical vibrator or chopper principle. The infrared radiation of the earth is collected through an input lens of germanium and falls on a circular chopper disk in the focal plane of this input lens. The chopper disk has a diameter approximately corresponding to the image of the earth and is periodically reciprocated with a determined frequency, the chopper frequency, and a determined amplitude, the chopper amplitude. The light from the two opposite earth rims, which is alternately released with the chopper frequency, i.e. the light falling through the input lens and being periodically interrupted by the chopper disk, is directed on a detector, e.g. a pyroelectric detector, via a spectral filter for the infrared range, a secondary lens consisting of a spherical mirror segment and a prism.

The output signal of the detector is amplified and subsequently synchronously demodulated with the chopper frequency. If the radiation energy received by the detector from the two earth rims is equal, a ZERO-signal is supplied by means of the synchronous demodulation. In this case, the line of sight of the earth-horizon sensor, which line of sight is fixed relative to the satellite, is directed directly at the earth central point, i.e. the satellite is located in the desired position. When the satellite is in an incorrect position, the line of sight of the earth-horizon sensor no longer coincides with the satellite/earth central point connecting line so that the output signal of the detector depends on the difference of the received radiation energy from the opposite earth rims. After the demodulation of the output signal synchronously with the chopper frequency, an off-course signal corresponding to the difference is obtained in this way which is a direct measurement of the off-course angle of the line of sight of the earth-horizon sensor in relation to the satellite/earth central point connecting line.

The off-course angle can be given in one axis with such an earth-horizon sensor. For triaxial stabilization, two such earth-horizon sensors are needed with which the off-course angle of the earth satellite is given, e.g. in the north-south and east-west direction.

The chopper disk is periodically reciprocated with a chopper frequency of approximately 40 Hz and with an amplitude of approximately 1/12 of the diameter of the chopper disk, i.e. by approximately 1.4 mm.

However, when determining the off-course angle it must be taken into account that the opposite earth rims do not always have the same temperature. This fact is designated as earth anomaly. The earth anomaly is particularly conspicuous in the north-south direction. This earth anomaly causes the off-course signal derived as described above to be affected with an anomaly error which can be regarded essentially as a parallel displacement of the characteristic line of the earth-horizon sensor. This anomaly error is, accordingly, essentially a zero point error and although it is only slight, it can, in extreme cases, amount to approximately ±20% of the linear measuring range of approximately one degree of the earth-horizon sensor.

Since geostationary earth satellites are also used for producing directional radio links and guided television links to the earth, the off-course signal which is subject to error because of the earth anomaly must be corrected by the anomaly portion. A plurality of methods are known for this purpose which are described in German Patent Application No. P 33 22 750.0 of the Applicant which is now copending application Ser. No. 745,020. Reference is made to this patent application. The idea of correcting the off-course signal is based substantially on the knowledge that the anomaly portion of the off-course signal has a very particular relationship to the respective chopper amplitude. By changing the chopper amplitude, the anomaly portion of the off-course signal can be calculated and the off-course signal can be corrected. Thus, for example, the chopper amplitude can be modulated or intermittently altered, or two earth-horizon sensors with different chopper amplitudes can be used. In small amplitude variations, the anomaly signal can be described by means of a horizontal straight line. In larger amplitude changes, the anomaly signal has a non-linearity which is dependent on the off-course angle, since the characteristic lines of the earth-horizon sensor do not run parallel for various amplitudes. In a narrowed measuring range of approximately ±1°, the anomaly signal in the known amplitude variations can be taken into account by means of a signal which is linearly dependent on the off-course angle. The above-mentioned patent application is referred to for taking into account the anomaly signal and for the correction of the off-course signal accordingly made possible.

SUMMARY OF THE INVENTION

The invention has the object of providing a method and an apparatus of the aforementioned type with which it is possible to use the earth-horizon sensor also for an attitude control for an orbiting earth satellite whose desired position does not coincide with the satellite/earth central point connecting line.

This object is met by a method and an apparatus according to the invention characterized in that the amplified output signal of the detector is additionally demodulated synchronously with the second harmonic wave of the chopper frequency thereby producing a presence signal which indicates whether and in what position the earth is located within the measuring range of the earth-horizon sensor, the presence signal being compared with a desired value signal which indicates the desired position of the line of sight of the earth-horizon sensor in relation to the satellite/earth central point connecting line, this line of sight being fixed with respect to said satellite, and the output signal of the detector being keyed with the chopper frequency and amplified in such a way that the difference between the presence signal and desired valued signal become ZERO.

Accordingly, the amplified output signal of the detector is additionally demodulated synchronously with the doubled chopper frequency. By means of this, a so-called presence signal is produced which indicates whether the earth lies within the pickup range of the earth sensor. This presence signal is independent from the earth anomaly and shows a curve over the off-course angle which can be represented by means of a cosine square function or—by means of trigometric conversion—by means of a cosine function of the doubled off-course angle with a zero point displacement of the ordinate. The presence signal has a peak at an off-course angle of ZERO and falls symmetrically in both directions from ZERO. This presence signal can now be compared with a desired value signal which indicates the desired position of the earth satellite in relation to the satellite/earth central point connecting line. This desired value signal can directly correspond to the satellite/earth central point connecting line, but can also be an offset-signal which indicates a desired position of the satellite in which the line of sight of the earth-horizon sensor, which line of sight is fixed relative to the satellite, is not directed to the earth central point. Such a processing of the earth-horizon signals, accordingly, corresponds to a calibration of the transmission function of the earth-horizon sensor in angle degrees so that the earth-horizon sensor can not only be used, as known, as a ZERO-seeking sensor, but also as an angle measuring sensor. New areas of application are thereby opened up in the position stabilization of orbiting satellites with such an earth-horizon sensor, e.g. a so-called "offset-pointing". A directional radio beam can therefore be directed from the earth satellite not only to a determined earth area, but also to other earth areas as a result of the possibility of measuring the absolute angle.

As mentioned above, the presence signal declines away from the ZERO value. The comparison of the presence signal with a desired value signal and the absolute angle mesurement, which is, accordingly, possible by means of the adjustment of the amplification control for the detector output signal, which adjustment is keyed with the chopper frequency, is disturbed by noise in larger offset positions, since in these positions, signals with relatively small amplitudes must be compared. Here, another improvement is possible. That is, if the presence signal is added to the amount of the anomaly-corrected off-course signal, a reference signal results whose curve over the off-course angle in the measuring range takes on definitely reproducible values and never takes on the ZERO value. This reference signal is also independent from the earth anomaly. If this reference signal is compared with a corresponding desired value, then the amplification of the output signal of the detector, in a manner similar to the above, can be keyed and adjusted in such a way that the difference between the reference signal and the desired value signal becomes ZERO. The off-course function can also be calibrated directly in angle degrees in the analog measuring range with this method. With the two indicated measuring methods, error magnitudes of the off-course signal can be suppressed substantially until the residual noise of the electronic circuit, i.e. the off-course signal is independent from the change of the mean earth temperature, independent from aging characteristics of the earth-horizon sensor and the amplifier employed, independent from the temperature cycle of the earth-horizon sensor and the amplifier, and also independent from transparency changes of the optical path.

When using only the presence signal for calibrating the earth-horizon sensor in angular signals, a part of the analog area of the earth sensor can be substantially corrected. When using the reference signal, the entire analog area, as well as the adjoining non-linear area, can be corrected as long as the earth is present.

DESCRIPTION OF THE DRAWINGS

The invention is explained in more detail in two embodiments with the aid of the drawings. Shown in the drawings are:

FIG. 3 the curve of the presence signal of the earth-horizon sensor, plotted over the off-course angle;

FIG. 4 the curve of the anomaly function for the earth anomaly taken into account in FIG. 2;

FIG. 5 a graph for showing the formation and the curve of the reference signal, plotted over the off-course angle;

DESCRIPTION OF THE PREFERRED EMBODIMENT

Figure 8:
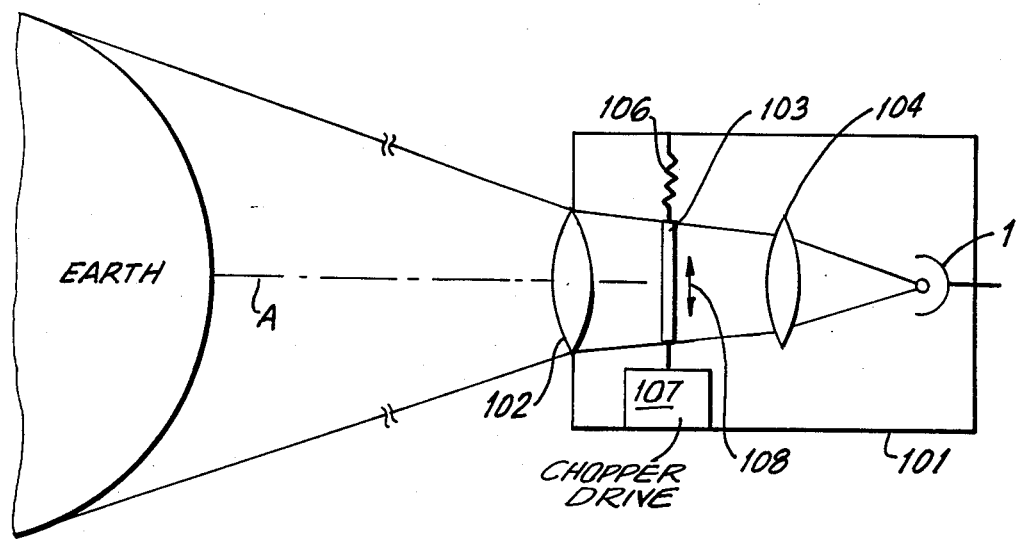
FIG. 8 a functional block diagram of an earth-horizon sensor.

In FIG. 8, a functional block diagram of the optical system of an earth-horizon sensor. This optical system includes a housing 101 with input optics 102, a chopper disk 103, intermediate optics 104 and a photodetector 1. In case of a correct attitude of the earth satellite, the optical axis A is oriented towards the center of the earth. Radiation emanating from the earth and its surroundings is received by the input optics 102 and concentrated onto the photodetector 1 by the intermediate optics 104. The opaque chopper disk 103 is arranged in the path of the beams between the input optics 102 and the intermediate optics 104 in such a way that the image of the earth is exaxtly covered, in view of this no radiation falls on the photodetector 1. The chopper disk 103 is connected with the housing 101 by a spring 106 and is periodically reciprocated in its plane by a chopper drive 107, as is indicated by the double arrow 108. The chopper disk 103 in its entirety is a spring-mass system oscillating at its natural frequency, so that only a small amount of energy is required for the periodic drive.

If the chopper disk 103 moves towards the top when viewed in the sketch, then radiation from the bottom rim of the earth now falls through the optics 102 and 104 onto the photodetector 1, so that it generates a signal. The amplitude of the chopper disk 103 is very small and lies within a range of about one-tenth of the diameter of the chopper disk 103. After reversing the motion, the chopper disk 103 moves toward the bottom through a neutral position shown at which the output current of the photodetector 1 is equal to zero. Subsequently, the radiation from the top earth rim falls through the optics 102, 104 onto the photodetector 1, so that it again puts out a signal. The course of this signal is, as easily seen, a sine curve. This sine curve signal is synchronously demodulated after being amplified. Herein the portions lying above and beneath the zero line of the sine curve signal are evaluated against one another. If the satellite is in the correct attitude as illustrated in the sketch, so that optical axis A is oriented towards the center of the earth, then the positive and negative portions of the sine curve signal are equal, so that after the synchronous demodulation, a zero signal appears at the output of the off-course demodulator. However, if the satellite is not correctly aligned, then the sine curve signal is not symmetrical to the line, wherein the radiation of one of the two earth rims is larger than the radiation emanating, respectively, from the other earth rim. Because of the evaluation of the portions of the since curve signal lying above and beneath the zero line, there appears at the synchronous demodulation, a positive or negative signal at the output of the photodetector 1 depending on the erroneous alignment of the optical axis A in the direction of one of the earth rims. The usual error deviations measured with this sensor lie within the range of $\pm 1°$.

Figure 1:
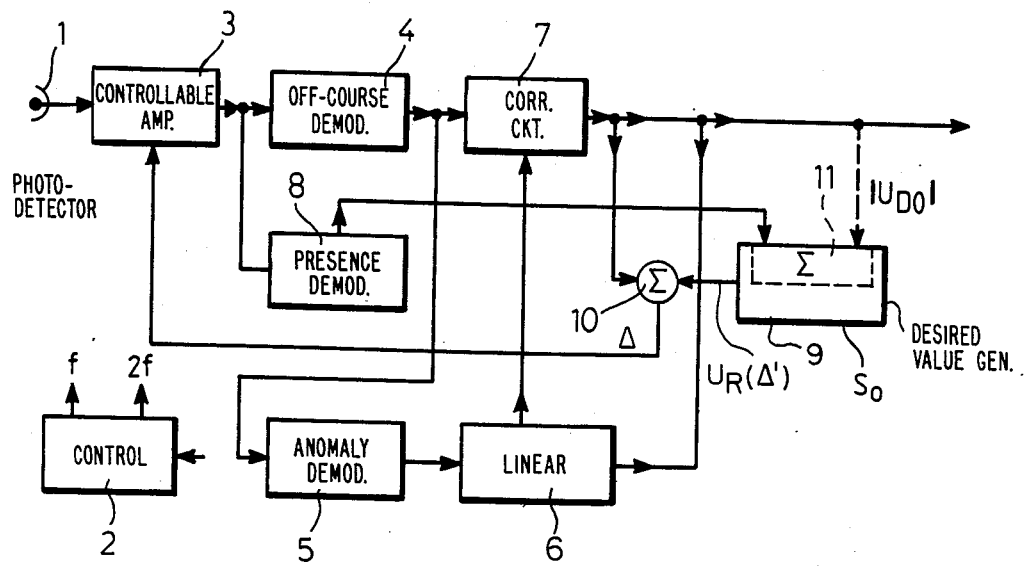
FIG. 1 a schematic block diagram of an evaluating circuit, according to the invention, for forming an off-course signal for a geostationary earth satellite by means of an earth-horizon sensor.

In FIG. 1, only one detector 1 of the earth-horizon sensor of the aforementioned type is shown which receives the light radiation of the two opposite earth rims, which light radiation is periodically interrupted by the chopper disk. The chopper disk is driven with a chopper frequency f so as to be controlled in such a way that the amplitude is modulated; the control of the chopper drive 107 of the chopper disk 103 and also the circuit elements of the evaluating circuit for the output signals of the photo detector 1, which circuit elements are shown in FIG. 1, is effected by a control block 2 whose connections to the individual elements of the earth-horizon sensor in FIG. 1 are not shown. The control 2 two control signals for the chopper frequency f and the doubled chopper frequency 2f.

The output signal of the detector 1 is fed to an amplification control means 3 whose amplification factor is adjustable. The output signal of this amplification control means 3 is demodulated with the chopper frequency f in an off-course demodulator 4. By means of the amplitude modulation of the movement of the chopper disk, the uncorrected off-course signal provided by the off-course demodulator 4 obtains a portion which is dependent on the off-course angle and a portion which originates from the earth anomaly. This uncorrected output signal is demodulated in an anomaly demodulator 5, subsequently linearized in a linearizer 6 and fed to a correction circuit 7 which is connected in series downstream of the off-course demodulator 4 for the anomaly correction. The corrected off-course signal, which is now independent of the earth anomaly, appears at the output of this correction circuit 7.

The circuit arrangement described thus far is based on the following principles. If there is no earth anomaly, the characteristic line of the earth-horizon sensor can be approximately shown by means of the following formula:

$$U_{D\alpha} = \frac{2}{\pi} \cdot K \cdot A \cdot \text{sine}\left(\alpha \cdot \frac{K_A}{A} \cdot 90\right) \tag{1}$$

The formula is applicable for the range $$-1 \leq \alpha \cdot \frac{K_A}{A} \leq +1$$

In the formula:
$U_{D\alpha}$ = the sensor off-course signal which is dependent on the off-course angle $\alpha$ and is measured as electrical current;
K = a constant proportionality factor which is determined by means of the sensor geometry;
A = chopper amplitude;
$\alpha$ = off-course angle of the line of sight of the earth-horizon sensor;
$K_A$ = a mechanical, likewise constant transmission factor.

The entire characteristic line extends over an angle area of approximately $\pm 18°$; the measuring range used for the sensor off-course angle is approximately $\pm 1°$. It can be seen that the characteristic line can be linearized for small off-course angles, specifically by means of the foowing formula:

$$U_{D\alpha}{}^x = K \cdot K_A \cdot \alpha \tag{2}$$

If the two earth rims radiate different energies then the entire characteristic line $U_D$ is composed of the above uninterrupted characteristic line $U_{D\alpha}$ and an anomaly portion $U_{DA}$:

$$U_D = U_{DA} + U_{D\alpha} \tag{3}$$

The anomaly portion $U_{DA}$ is then:

$$U_{DA} = K \cdot A \cdot \frac{1 - V}{1 + V} \tag{4}$$

On the basis of the above formulas 1, 3 and 4, then, there follows for the characteristics line $U_D$ of the earth-horizon sensor:

$$U_D = K \cdot A \cdot \frac{1 - V}{1 + V} + \frac{2}{\pi} \cdot K \cdot A \cdot \text{sine}\left(\alpha \frac{K_A}{A} \cdot 90\right) \tag{5}$$

for $-1 \leq \alpha \frac{K_A}{A} \leq +1$ of for small values $\alpha$ $$U_D{}^x = K \cdot A \cdot \frac{1 - V}{1 + V} + K \cdot K_A \cdot \alpha \tag{6}$$

It follows from formulas 4 to 6 that, as indicated above, the anomaly portion of the sensor off-course signal depends only on the anomaly V and the chopper amplitude A.

If the sensor off-course signal is now measured at two different chopper amplitudes A and A1, the anomaly portion $U_{DA}$ will be independent of the anomaly V at least for small angles. For small angles $$U_{DA} = \frac{A}{A - A_1} (U_D - U_{D1}) \qquad (7)$$

applies for the anomaly portion and $$U_{Da}^x = U_D - \frac{A}{A - A_1} (U_D - U_{1D}) \qquad (8)$$

applies for the characteristic line $U_{Da}^x$ which is simplified, corrected and true for small off-course angles $\alpha$ For the earth anomaly V there follows:

$$V = \frac{(A - A_1) \cdot K - (U_D - U_{D1})}{(A - A_1) \cdot K + (U_D - U_{D1})} \qquad (9)$$

from which it follows that the earth anomaly depends only on the chopper amplitude and the sensor off-course signals at the different chopper amplitudes. Of course, for large off-course angles, the complete formula for the characteristic lines must be made use of.

Figure 2:
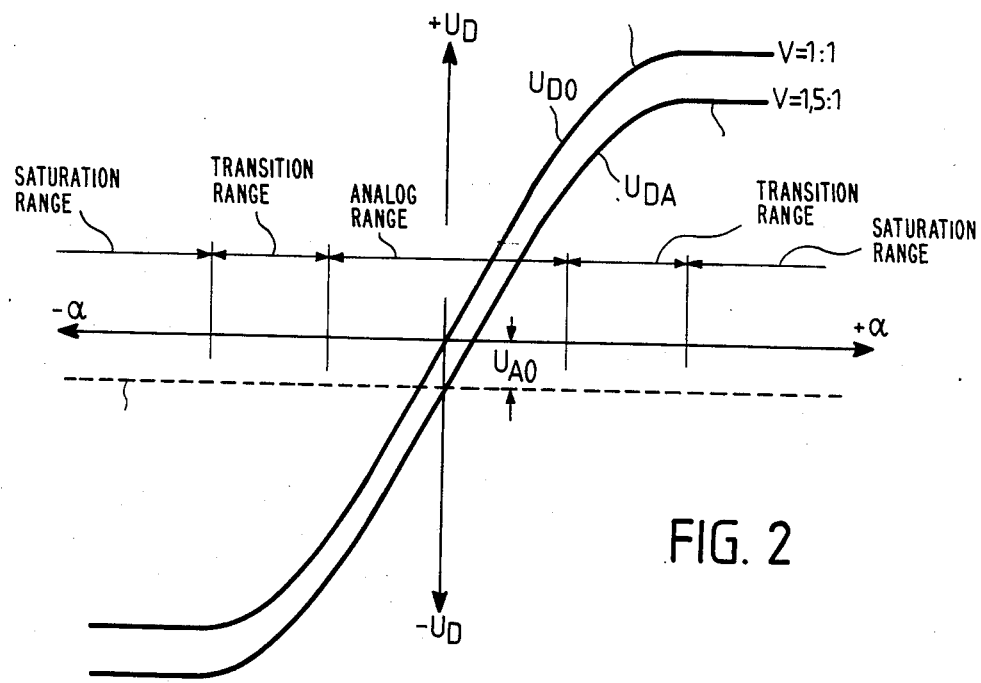
FIG. 2 the characteristic line of the earth-horizon sensor for the off-course signal, plotted over the off-course angle, with and without corrected earth anomaly.

In FIG. 2, the off-course signal $U_D$ is plotted over the off-course angle $\alpha$, namely, first, as off-course signal $U_{DO}$ without or with corrected earth anomaly, respectively, and, secondly, as, off-course signal $U_{DA}$ with an earth anomaly $V = 1.5 : 1$. The earth anomaly V designates the ratio of the radiation energies received from the left and right earth rims, respectively. It can be seen that the off-course signal in both cases has an analog measuring range located at both sides of the zero point in which the characteristic lines extend approximately linearly. Adjoining this analog measuring range at both sides are transition areas within which the characteristic lines extend in a curved manner until they pass into adjoining saturation areas at an approximately constant end value. It can be seen that the characteristic line $U_{DO}$ runs exactly through the zero point of the coordinate system, while the characteristic line $U_{DA}$ is displaced relative to the characteristic line $U_{DO}$ by an anomaly portion $U_{AO}$. As follows from FIG. 4, the value $U_A$ is constantly $U_{AO}$ in the analog area, then increases in the transition area and passes into a constant value again in the saturation area. For a geostationary earth satellite, the analog measuring range used for the off-course angle is approximately $\pm 0.6°$.

By means of the demodulation of the uncorrected off-course signal in the anomaly demodulator 5, and by means of subsequent linearization and correction with the above-indicated circuit elements, the characteristic line $U_{DA}$ of the earth-horizon sensor is displaced in such a way when there is an earth anomaly that it coincides with the characteristic line $U_{DO}$. An off-course angle can then be definitely assigned to each measuring value.

The output signal of the amplification control means 3 is demodulated with the doubled chopper frequency 2f in a presence demodulator 8 in a controlled manner by the control 2. The presence signal $U_P$ produced in this manner is a measurement of the centering between the zero point of the earth-horizon sensor and the earth central point, i.e. a measurement for the deviation of the line of sight of the earth-horizon sensor, which line of sight is fixed relative to the satellite, relative to the satellite/earth central point connecting line, and independently from the earth anomaly. The bell-shaped curve of the presence signal, plotted over the off-course angle, is shown in FIG. 3.

Figure 6:
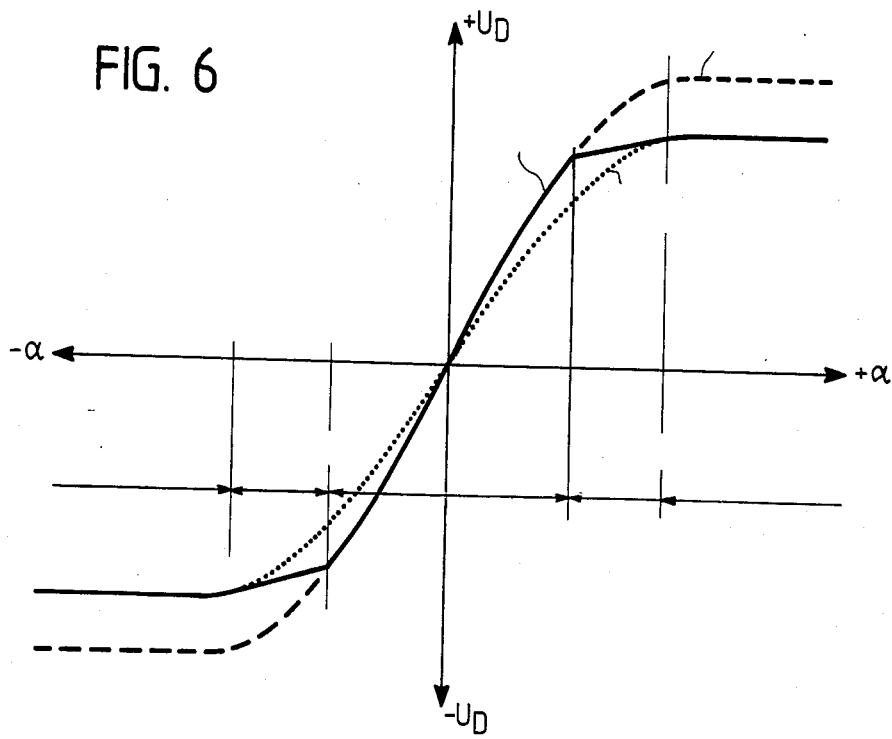
FIG. 6 a graph for showing the correction of the off-course signal by means of the presence signal.

The presence signal is fed to a desired value generator 9 in which a desired value is given for the deviation of the line of sight, which is fixed with respect to the satellite, from the satellite/earth central point connecting line. This desired value can correspond to a deviation of 0 so that the earth satellite is centered on the earth central point, but it can also take on another value when the satellite is not aligned to the earth central point, i.e. when a so-called "off-pointing" is desired. A reference signal $U_R$, corresponding to a function between the presence signal, and the desired value signal appears at the output of the desired value transmitter 9. This reference signal is fed, along with the corrected off-course signal, to a summing element 10 whose output signal $\Delta$ is fed back to an amplification control input of the amplification control means 3. By means of this signal $\Delta$ the amplification factor of the amplification control means 3 is adjusted in such a way that the difference $\Delta$ becomes ZERO. This process is shown schematically in FIG. 6. The desired curve of the deviation, as pregiven in the desired value generator 9, is drawn in a dashed line, while the deviation downgrades in a dotted line, i.e. in the adjusted "off-pointing". By means of the above-mentioned change of the amplification factor, the dotted characteristic line, corresponding to the downgraded deviation, is, so to speak, drawn into the desired characteristic line, which is shown in FIG. 6 by the solid line. This has the advantage that the signals of the earth-horizon sensor can be treated, despite the "off-pointing", as if the earth satellite were aligned with the earth central point. This method is, accordingly, a calibration of the characteristic lines in the downgraded deviation to the desired characteristic line of the earth-horizon sensor. The earth-horizon sensor can, accordingly, be used not only as a ZERO-seeking sensor, but also as an angle-measuring sensor.

As follows from FIG. 3, the presence signal $U_P$ has positive values in the analog measuring range which can be used for the above correction. Adjoining the analog measuring area, the amplitudes of the presence signal are only relatively slight so that the above calibration would be subject to considerable noise and would no longer be definite. In these areas, i.e. in the transition area and in the saturation area, this calibration is no longer carried out by means of the presence signal; rather, the characteristic line is fed from the analog measuring range in the transition area to the characteristic line in the saturation area during downgraded deviation.

Figure 7:
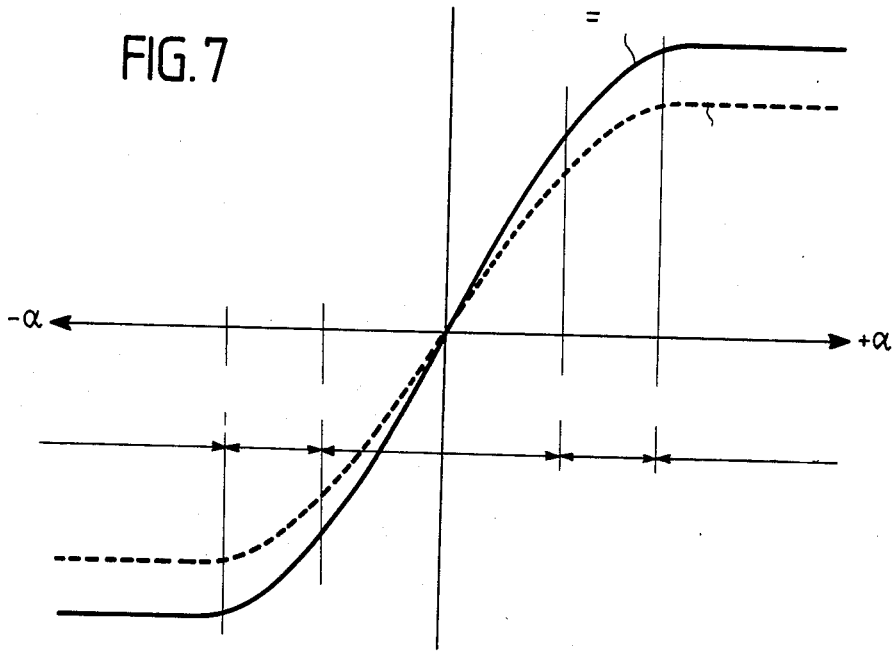
FIG. 7 a graph for showing the correction of the off-course signal by means of the reference signal.

The calibration of the characteristic line of the earth-horizon sensor in downgraded deviation to the desired value characteristic line can, however, be carried out over the entire measuring range of the earth-horizon sensor when the reference signal $U_R$ is used for this purpose rather than the presence signal $U_P$. The formation and the curve of this reference signal $U_R$ are shown in FIG. 5. The reference signal $U_R$ is obtained when the presence signal $U_P$ is added to the amount of the anomaly-corrected off-course signal $|U_{DO}|$. The reference signal $U_R$ has a value which is symmetrical to the ordinate and which accepts a reproducible value for every angular value in the measuring range of approximately $\pm 18°$, which value never becomes ZERO and is independent from the earth anomaly. The processing of this reference signal is shown in a dashed line in the block diagram in FIG. 1. The presence signal of the presence demodulator 8 is fed to a summing element 11 within the desired value generator 9 together with the corrected off-course signal. The presence signal is added in this summing element 11 to the amount of the corrected off-course signal so that the reference signal $U_R$ appears at the output of this summing element 11. In the desired value or reference generator 9 a comparison of the reference signal with the desired value is effected, as above, so that a difference signal $\Delta'$ appears at the output of the desired value or reference generator 9 which is fed to the summing element 10. The amplification factor of the amplification control means 3 is in turn adjusted in such a way that this difference is made to ZERO. This process is shown in FIG. 7 in which the desired characteristic line of the earth-horizon sensor with corrected earth anomaly and alignment of the line of sight to the earth central point is shown in a solid line, while the downgraded deviation, i.e. in an "off-pointing", is shown in a dashed line. By means of the above-mentioned calibration with the aid of the reference signal this characteristic line is drawn into the desired characteristic line of the earth-horizon sensor during downgraded deviation, wherein this can be effected over the entire measuring range of the earth-horizon sensor. The circuit expenditure for the calibration of the characteristic line of the earth-horizon sensor accompanied by the use of the reference signal is slightly higher than in the calibration, described above, by means of the presence signal alone.

What is claimed is:

1. A method for deriving an off-course signal for an orbiting earth satellite by means of an earth-horizon sensor, which operates in the infrared range, comprising, in the focal plane of an input lens, a chopper disk, which is periodically reiprocated with a determined chopper frequency and has a diameter corresponding to the image of the earth, and a detector receiving periodically interrupted light radiation of opposite earth rims, wherein an output signal of said detector is demodulated synchronously with said chopper frequency and is corrected with a correcting signal (anomaly signal) corresponding to different temperatures of said opposite earth rims (earth anomaly) in order to form an angle-dependent off-course signal, characterized in that said method comprises amplifying and synchronously demodulating the output signal of said detector with the second harmonic wave of said chopper frequency thereby producing a presence signal which indicates whether, and in what position, the earth is located within a measuring range of said earth-horizon sensor, comparing said presence signal with a desired value signal which indicates a desired position of a line of sight of the earth-horizon sensor in relation to a satellite/earth central point connecting line, said line of sight being fixed with respect to said satellite, and keying said output signal of said detector with said chopper frequency and amplifying said output signal in such a way that a difference between said presence signal and said desired value signal becomes ZERO.

2. Method according to claim 1, characterized in that said method comprises adding said presence signal to the angle dependent off-course signal in order to form a reference signal, and comparing said reference signal with said desired value signal.

3. Apparatus for deriving an off-course signal for a geostationary earth satellite with an earth-horizon sensor operating in the infrared range and comprising, in the focal plane of an input lens, a chopner disk periodically reciprocated with a determined chopper frequency and having a diameter corresponding to the image of the earth, and a detector receiving periodically interrupted light radiation of opposite earth rims, said apparatus comprising an off-course demodulator for demodulating an output signal of said detector with said chopper frequency and a correction circuit for determining an anomaly signal caused by different temperatures of opposite earth rims (earth anomaly) and for correcting the output signal of said off-course demodulator with said anomaly signal, characterized in that an amplifier timed with said chopper frequency (f) and having an adjustable amplification factor is connected to the output of said detector, output of said amplifier being connected to said off-course demodulator and to a presence demodulator synchronized with a doubled chopper frequency (2f), an output of said presence demodulator being connected to a desired value generator, and a summing element being provided, to which is fed said anomaly-corrected off-course signal ($U_{DO}$) and a reference signal ($U_R$) formed from the presence signal ($U_P$) and the off-course signal, and an output of said summing element being connected to an amplification factor control input of said amplifier in order to adjust its amplification so that the output signal ($\Delta$) of said summing element becomes zero.

4. Apparatus according to claim 3, characterized in that the output of said presence demodulator and a circuit point at which the anomaly-corrected off-course signal ($U_{DO}$) appears are connected with inputs of a further summing element which provides a reference signal ($U_R$), and an output of said further summing element being connected to said desired value generator.

* * * * *

UNITED STATES PATENT AND TRADEMARK OFFICE
CERTIFICATE OF CORRECTION

PATENT NO. : 4,667,104

DATED : May 19, 1987

INVENTOR(S) : Dieter Sodeikat

It is certified that error appears in the above-identified patent and that said Letters Patent is hereby corrected as shown below:

In the heading of the Patent, it should read:

-- [54] METHOD AND APPARATUS FOR DERIVING AN OFF-COURSE SIGNAL FOR AN ORBITING EARTH SATELLITE BY MEANS OF AN EARTH-HORIZON SENSOR

Signed and Sealed this

Twentieth Day of October, 1987

*Attest:*

DONALD J. QUIGG

*Attesting Officer*     *Commissioner of Patents and Trademarks*